(12) United States Patent
Yamamoto et al.

(10) Patent No.: US 8,139,352 B2
(45) Date of Patent: Mar. 20, 2012

(54) MEDIUM DRIVE UNIT AND ELECTRONIC EQUIPMENT

(75) Inventors: Yasufumi Yamamoto, Kawasaki (JP); Kaigo Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 315 days.

(21) Appl. No.: 12/621,118

(22) Filed: Nov. 18, 2009

(65) Prior Publication Data

US 2010/0124007 A1   May 20, 2010

(30) Foreign Application Priority Data

Nov. 20, 2008   (JP) ................................. 2008-296303

(51) Int. Cl.
 *G06F 1/16* (2006.01)
(52) U.S. Cl. ............................... 361/679.39; 312/223.2
(58) Field of Classification Search ............ 361/679.39; 312/223.2
See application file for complete search history.

(56) References Cited

U.S. PATENT DOCUMENTS

| | | | | |
|---|---|---|---|---|
| 6,332,658 B1 * | 12/2001 | Sato et al. | ................... | 312/223.2 |
| 6,785,141 B2 * | 8/2004 | Fang | ................ | 361/727 |
| 7,265,987 B2 * | 9/2007 | Zhang et al. | ................... | 361/727 |
| 7,511,953 B2 * | 3/2009 | Tao et al. | ................. | 361/679.39 |
| 7,558,058 B2 * | 7/2009 | Hidaka | ...................... | 361/679.38 |
| 7,793,312 B2 * | 9/2010 | Yang | .............................. | 720/610 |
| 7,864,522 B1 * | 1/2011 | Peng et al. | ............... | 361/679.33 |
| 8,009,416 B2 * | 8/2011 | Kang | ........................ | 361/679.38 |
| 2006/0232923 A1 * | 10/2006 | Liang | ............................ | 361/685 |
| 2008/0089022 A1 * | 4/2008 | Cheung et al. | ................ | 361/685 |
| 2009/0073644 A1 * | 3/2009 | Yang | .......................... | 361/679.4 |
| 2010/0053881 A1 * | 3/2010 | Watanabe | ................ | 361/679.33 |
| 2010/0187957 A1 * | 7/2010 | Liang | ......................... | 312/223.2 |

FOREIGN PATENT DOCUMENTS

| | | |
|---|---|---|
| JP | 11-66830 | 3/1999 |
| JP | 2007-311050 | 11/2007 |

* cited by examiner

*Primary Examiner* — Lisa Lea Edmonds
(74) *Attorney, Agent, or Firm* — Staas & Halsey LLP (57) ABSTRACT

A medium drive unit includes a frame having an operating section, on a rear surface of which facing the main body side of the frame is provided a projection projecting toward the button, and which, upon receiving a depression operation from an outer surface side facing the outside, is biased toward the main body side and pushes the button with the leading end of the projection, a frame main body which surrounds the operating section so as to be separated from the operating section by an opening which extends surrounding the operating section, and passes through the front and rear surfaces of the frame, and an elastic support piece which extends through the opening along an edge of the operating section adjacent to the opening, of which one end is connected to the frame main body and the other end to the operating section.

6 Claims, 13 Drawing Sheets

MEDIUM DRIVE UNIT AND ELECTRONIC EQUIPMENT

CROSS-REFERENCE TO RELATED APPLICATIONS

This application is based upon and claims the benefit of priority of the prior Japanese Patent Application No. 2008-296303, filed on Nov. 20, 2008, the entire contents of which are incorporated herein by reference.

BACKGROUND

In recent years, a personal computer (hereafter abbreviated as a PC) has become widespread not only in offices, but also at home. As one form of the PC, a so-called notebook personal computer (hereafter abbreviated as a notebook PC) has been widely known which includes a main body unit on the upper surface of which a keyboard is provided, and a display unit which, as well as being connected to the main body unit by a hinge member so as to be openable and closable, is provided with a display panel, and which is used with the display unit opened away from the main body unit into a stand-up position, and folded when not used in such a way that a display screen is superimposed on the keyboard.

Also, a medium drive unit which drives a storage medium such as a CD or DVD is provided in the PC such as the notebook PC. A tray on which the storage medium is mounted, and a decorative panel disposed on the front surface of the tray, are provided in the medium drive unit. Also, apart from the decorative panel, a depression button which is depressed to slide the tray out is provided. Also, a switch section which operates in response to the depression button being depressed is provided on the tray.

Herein, there are various proposals concerning a device of an operation button itself, and a structure of attaching the operation button to the decorative panel.

SUMMARY

A medium drive unit includes a main body into which a storage medium is removably loaded, and which drives the loaded storage medium, a housing body which slidably houses the main body, and a frame which covers a front end face of the main body on a side toward which the main body slides out from the housing body. The main body has a button that is provided on the front end face of the main body and is configured to be depressed in order to slide the main body out from the housing body. The frame includes an operating section including a projection disposed on a rear surface thereof facing the front end face of the main body, the projection projecting toward the button and being configured, upon receiving a depression operation from an outer surface side of the operating section, to be biased toward the front end face of the main body and to push the button with a leading end of the projection, a frame main body that surrounds the operating section so as to be separated from the operating section by an opening that surrounds the operating section and passes through a front surface and a rear surface of the frame, and an elastic support piece that extends through the opening along an edge of the operating section adjacent to the opening, the elastic support piece including one end that is connected to the frame main body and another end that is connected to the operating section and being configured to bend elastically and bias the operating section toward the front end face of the main body when the operating section receives the depression operation, wherein the whole of the frame, including the frame main body, operating section, and elastic support piece, is integrally formed.

The object and advantages of the various embodiments will be realized and attained by means of the elements and combinations particularly pointed out in the claims.

It is to be understood that both the foregoing general description and the following detailed description are exemplary and explanatory and are not restrictive of the various embodiments, as claimed.

DESCRIPTION OF EMBODIMENTS

Hereafter, a description will be given of various embodiments. Hereafter, a description will be given adopting a notebook PC which is one example of electronic equipment.

Figure 1:
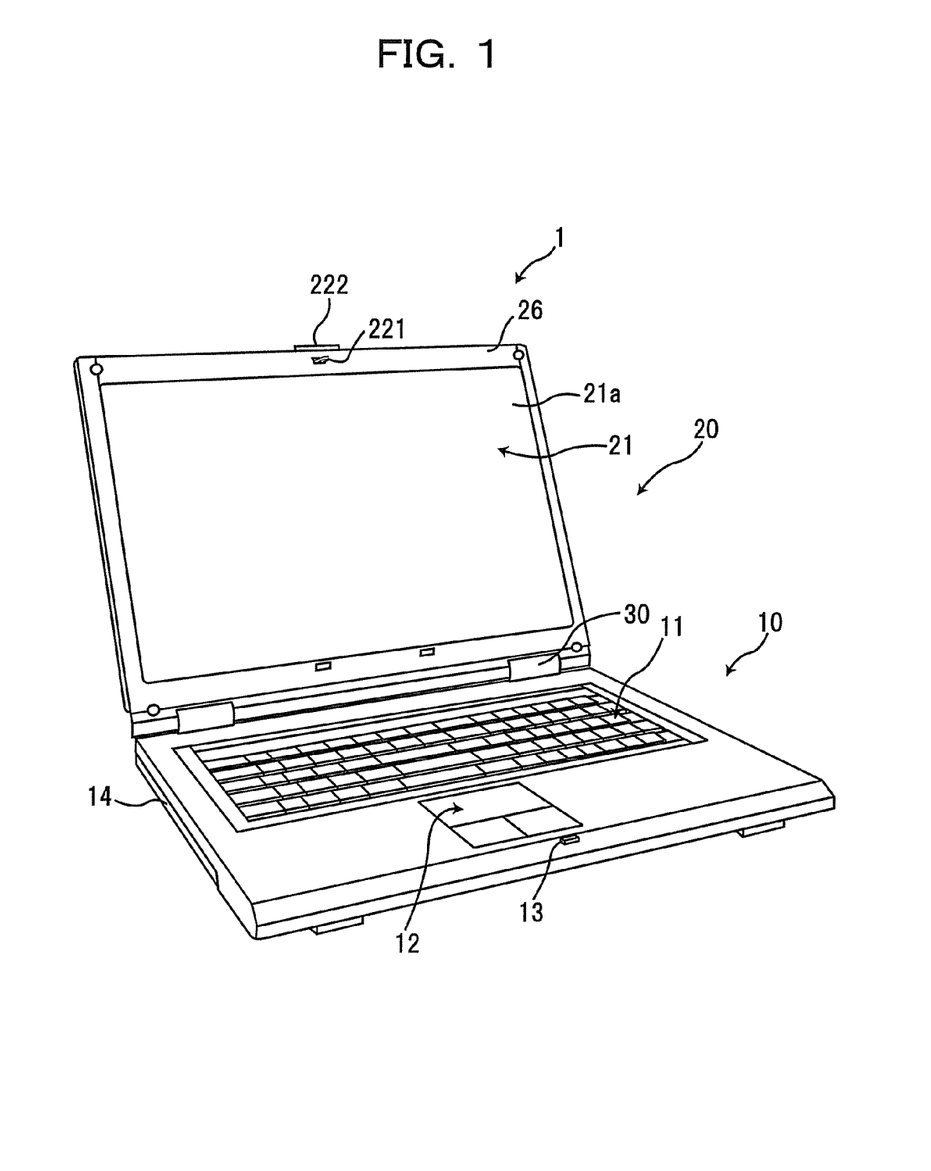
FIG. 1 is a perspective view of a notebook PC in an open condition, illustrating an exterior thereof.
Figure 2:
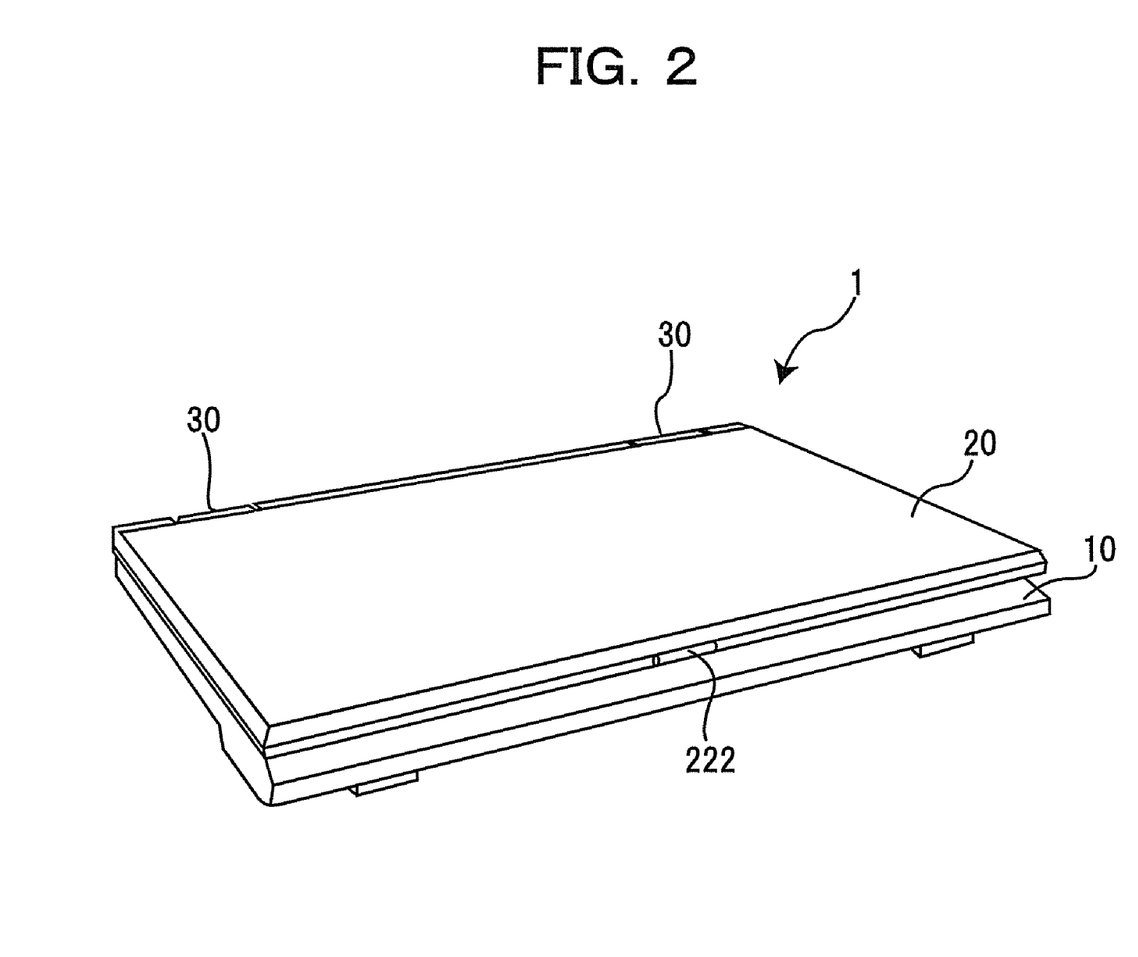
FIG. 2 is a perspective view of the notebook PC in a closed condition.

FIG. 1 is a perspective view of a notebook PC in an open condition, illustrating an exterior thereof. Also, FIG. 2 is a perspective view of the notebook PC in a closed condition.

The notebook PC 1 is configured of a computation unit 10 and a display unit 20. The display unit 20 is connected to the computation unit 10 by a hinge member 30 in such a way as to be openable and closable between the closed condition in which it is superimposed on the computation unit 10 (refer to FIG. 2) and the open condition in which it is opened away from the computation unit 10 (refer to FIG. 1).

A keyboard 11, a trackpad 12, and a fitting hole 13 are disposed on the top surface of the computation unit 10. The keyboard 11 is one with which to input an instruction in accordance with an operation. Also, the trackpad 12 is one kind of pointing device with which to indicate an optional point on a display screen 21a in accordance with an operation. Also, the fitting hole 13 is a hole into which a locking hook 221 fits.

Also, as shown in FIG. 1, a CD/DVD drive unit 14 is provided in the left side surface of the computation unit 10.

The CD/DVD drive unit 14 is a unit into which is loaded a storage medium such as a CD or DVD, and which drives the loaded storage medium. The CD/DVD drive unit 14 is one example of a medium drive unit.

Furthermore, a CPU and a large number of other electronic parts are embedded in the computation unit 10, and a variety of computation processes are carried out by an execution of a program.

Meanwhile, the display screen 21a configuring a display panel 21 is disposed on the front surface of the display unit 20. The perimeter of the display screen 21a is covered with a front frame 26. Also, the locking hook 221 projects from a position of the front frame 26 above the upper edge of the display screen 21a on the front surface of the display unit 20. The hook 221 fits into the fitting hole 13 in the top surface of the computation unit 10 when the display unit 20 is closed onto the computation unit 10, and is retained in the fitting hole 13 in such a way that the display unit 20 is not inadvertently opened away from the computation unit 10.

Furthermore, an unlocking operator 222 is disposed on the upper end face of the display unit 20. On pushing the operator 222, the hook 221 moves in a direction in which it is unlocked and, by pushing the operator 222 when the display unit 20 is in the closed condition illustrated in FIG. 2, it is possible to release the hook 221 from the fitting hole 13, and open the display unit 20.

The above being a general description of the whole of the notebook PC, a description will hereafter be given of a structure of the CD/DVD drive unit 14 which is a feature of an embodiment of the invention.

Figure 3:
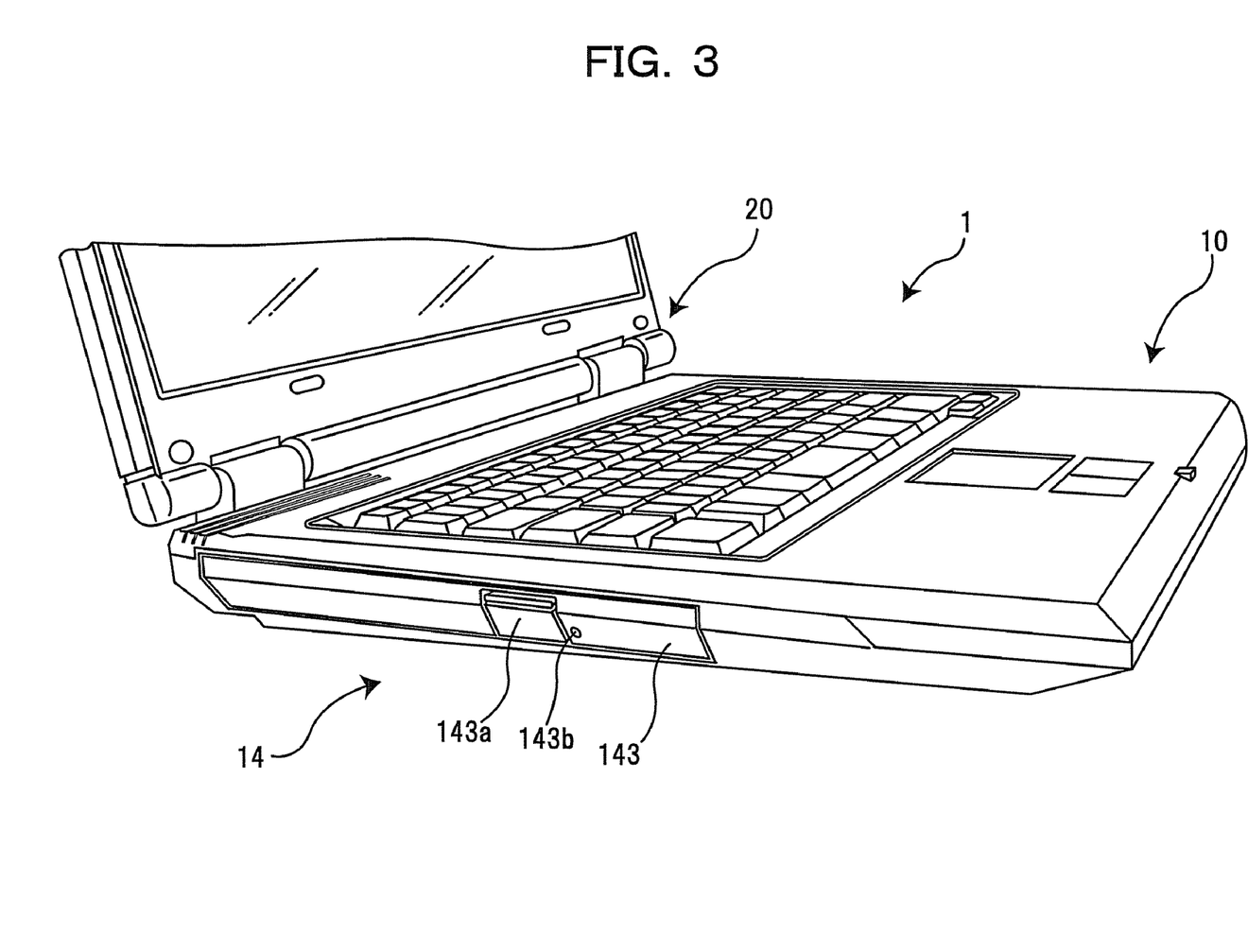
FIG. 3 is a perspective view of the notebook PC in the open condition, seen from the left side surface.
Figure 4:
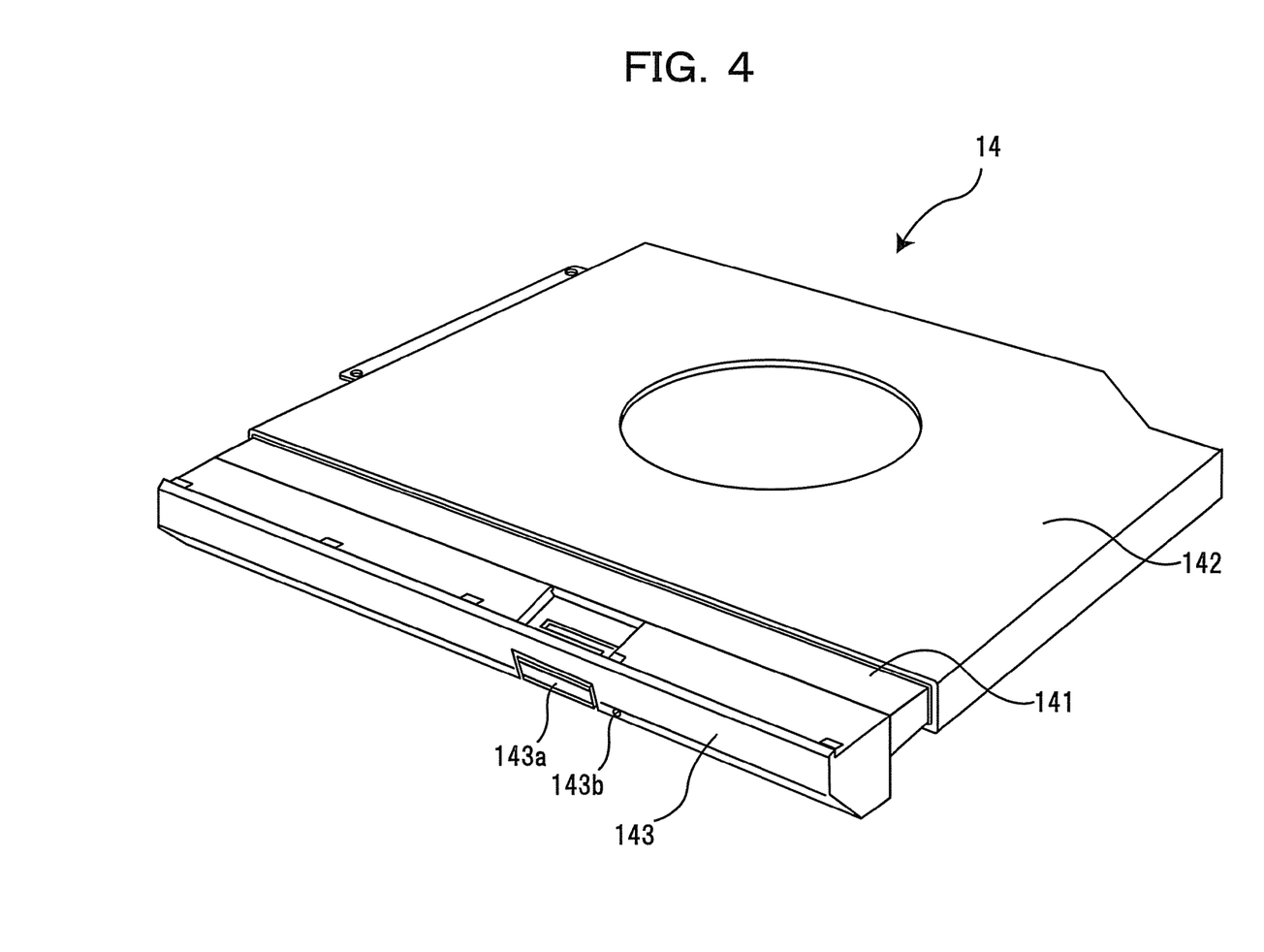
FIG. 4 is a perspective view illustrating a CD/DVD drive unit provided in a main body unit of the notebook PC, removed therefrom.

FIG. 3 is a perspective view of the notebook PC in the open condition, seen from the left side surface. Also, FIG. 4 is a perspective view illustrating the CD/DVD drive unit provided in a main body unit of the notebook PC, removed therefrom.

As illustrated in FIG. 3, the CD/DVD drive unit 14 into which is loaded the storage medium such as a CD or DVD, and which drives the loaded storage medium, is provided in the left side surface of the computation unit 10.

The CD/DVD drive unit 14 is provided with a main body 141 and a housing body 142. The main body 141 is a tray shaped member into which the storage medium is removably loaded, and which drives the loaded storage medium. Also, the housing body 142 is a member which slidably houses the main body 141. Also, the CD/DVD drive unit 14 is provided with a frame 143. The frame 143 is a member which covers a front end face of the main body 141 on a side toward which the main body 141 slides out from the housing body 142. The frame 143 is one which forms one portion of the left side surface of the computation unit 10 of the notebook PC 1. The frame 143 has an operating section 143a, to be described hereafter. Also, the frame 143 has an opening 143b for removing the main body 141 from the housing body 142 by sliding, using a tool, at a time of maintenance.

Figure 5:
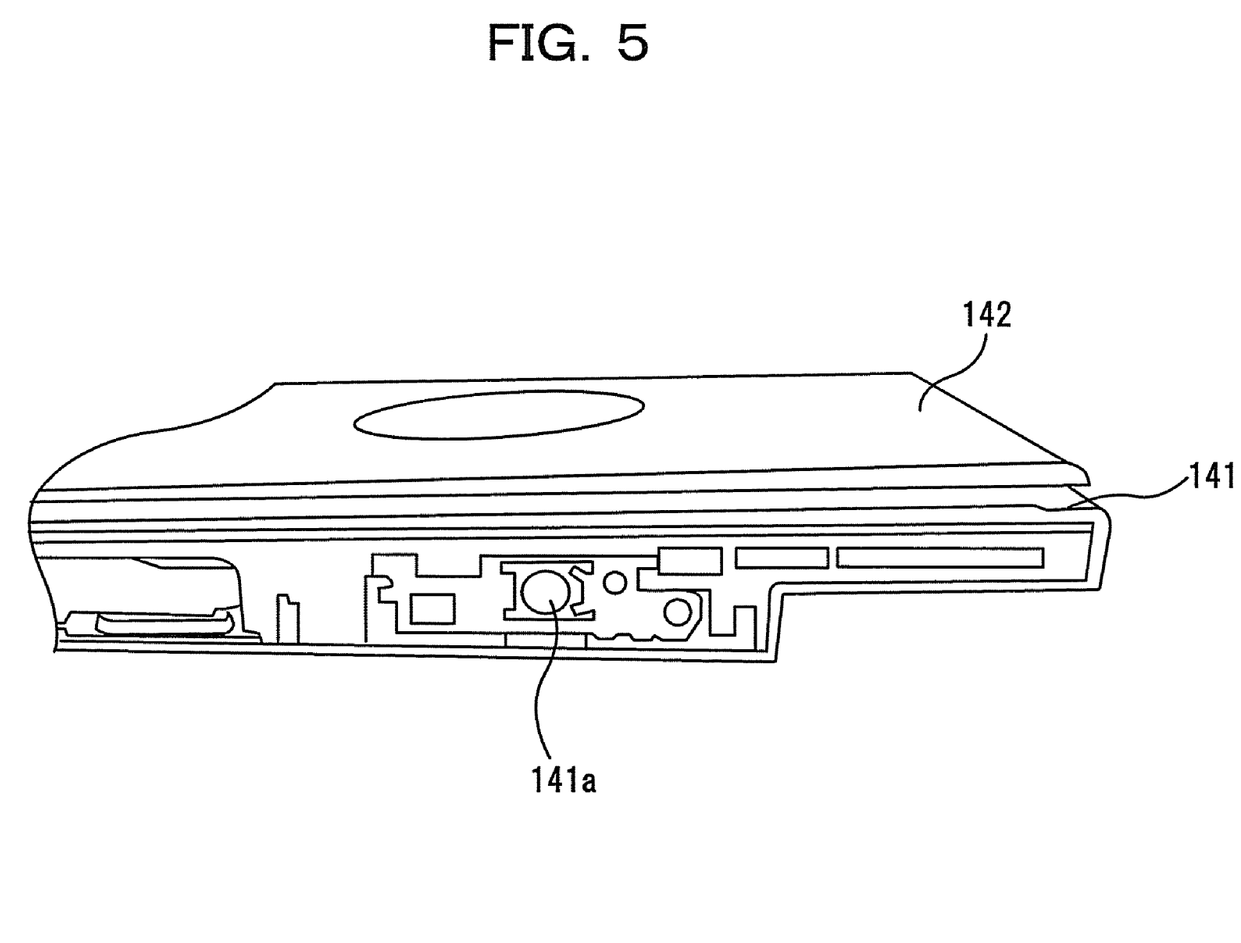
FIG. 5 illustrates the front end face of the main body in a condition in which a frame is removed.
Figure 6:
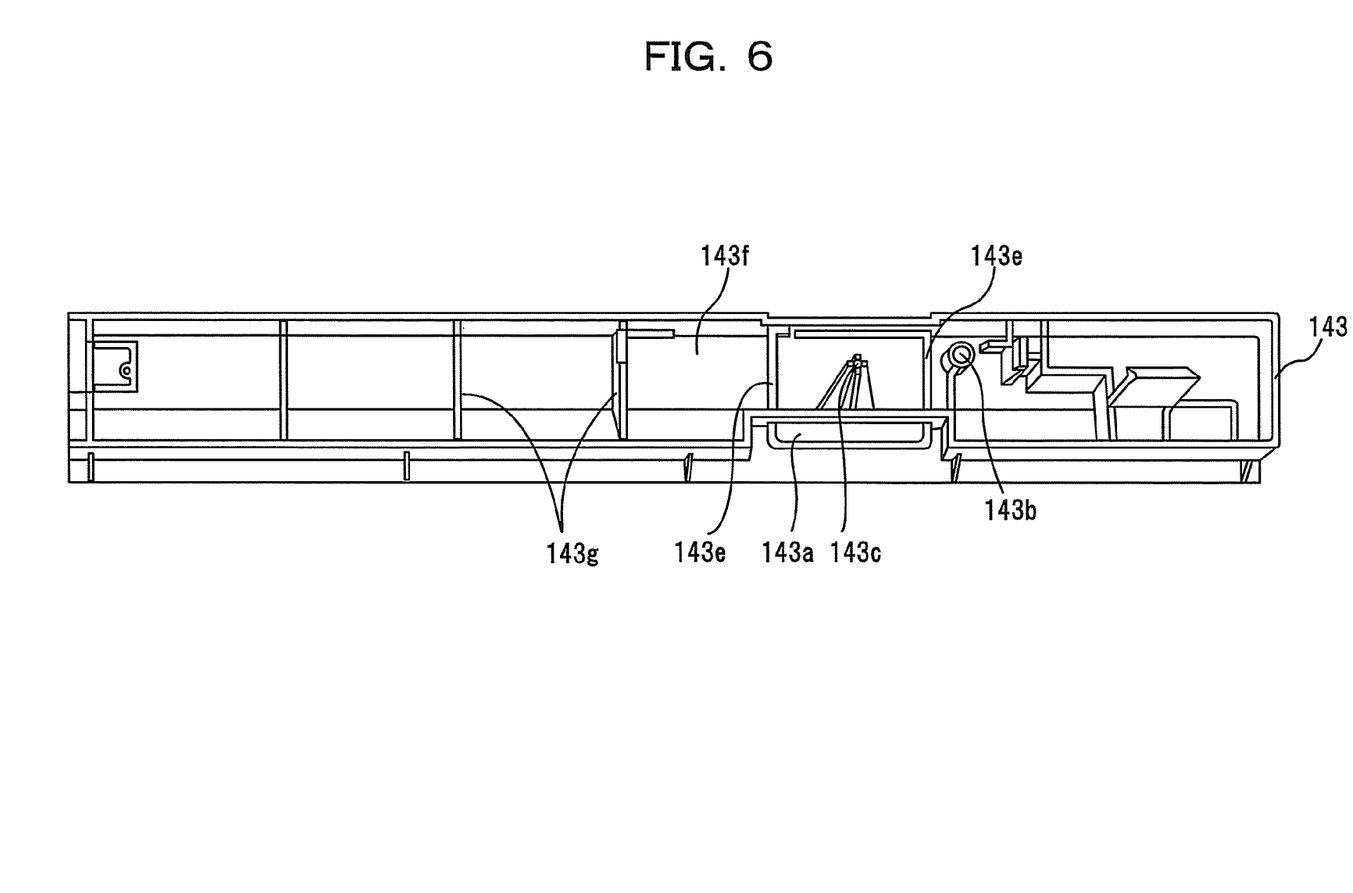
FIG. 6 illustrates the rear surface of the frame in a condition in which it is removed from the main body.

FIG. 5 illustrates the front end face of the main body in a condition in which the frame is removed. Also, FIG. 6 illustrates the rear surface of the frame in a condition in which it is removed from the main body.

As illustrated in FIG. 5, a button 141a which is depressed to slide the main body 141 out from the housing body 142 is provided on the front end face of the main body 141. Also, as illustrated in FIG. 6, a projection 143c which projects toward the button 141a (refer to FIG. 5) provided on the front end face of the main body 141 is provided on a rear surface of the operating section 143a of the frame which faces the main body 141 side of the frame 143. The operating section 143a, by receiving a depression operation from an outer surface facing the outside, is biased toward the main body 141, and pushes the button 141a (refer to FIG. 5) with the leading end of the projection 143c.

Also, an opening 143e is formed in the frame 143. The opening 143e, extending surrounding the operating section 143a, passes through the front and rear surfaces of the frame 143.

A frame main body 143f configuring the frame 143 surrounds the operating section 143a so as to be separated from the operating section 143a by the opening 143e.

The frame main body 143f has ribs 143g erected on the rear surface. The strength of the frame main body 143f is increased due to the ribs 143g, and the frame main body 143f is formed so as to be accordingly thin, contributing to a weight saving and a material cost cutting.

The frame main body 143f supports the operating section 143a by interposing an elastic support piece, to be described hereafter. The frame 143 is an article, the whole of which, including the frame main body 143f, the operating section 143a, and the elastic support piece to be described hereafter, is integrally formed. The frame 143 of the embodiment is a molded article integrally formed from, for example, a resin. Because of this, a cost reduction is achieved, such as by reducing the number of parts, or reducing the number of assembly processes, in comparison with a case in which the operating section 143a is configured of a part differing from that of the frame main body 143f. It is acceptable that the frame 143 is integrally formed from another material such as a metal, rather than a resin as in the embodiment, as long as it is a material which is elastically deformed.

Figure 7:
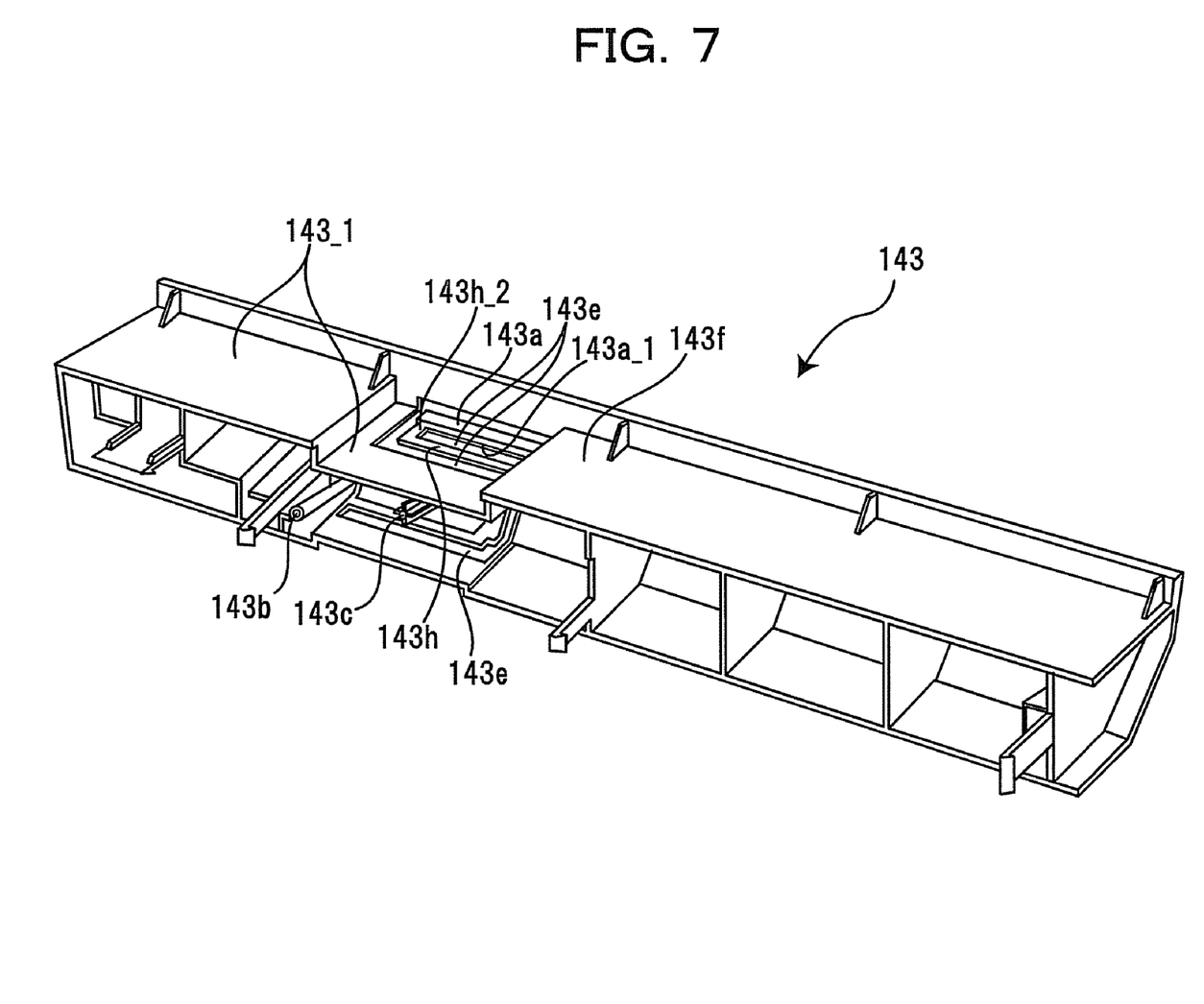
FIG. 7 is a perspective view of the frame illustrated from a direction in which the upper surface and rear surface thereof are viewed.

Hereafter, a description will be given centered on the elastic support piece. FIG. 7 is a perspective view of the frame illustrated from a direction in which the upper surface and rear surface thereof are viewed.

Figure 8:
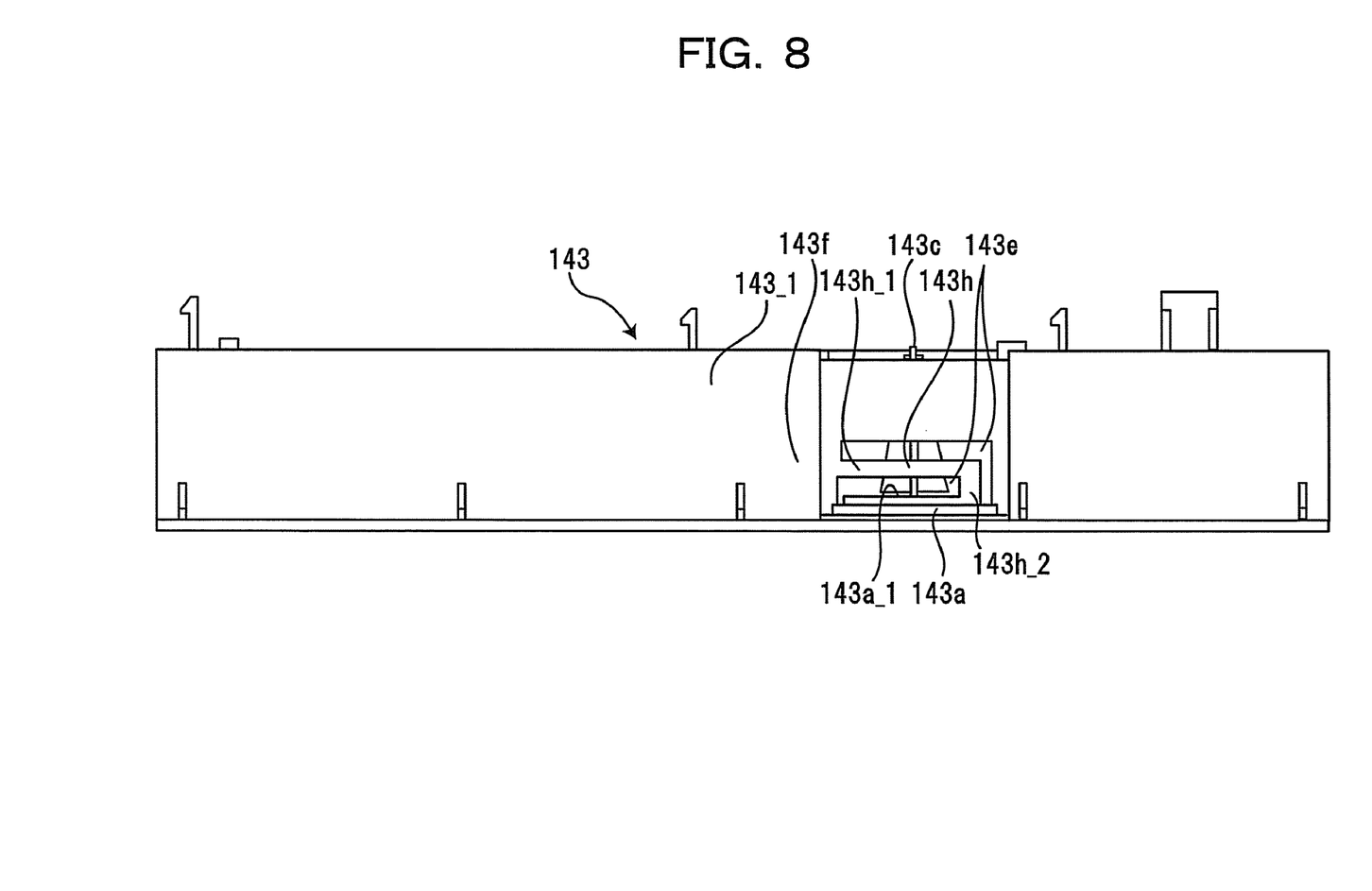
FIG. 8 is a plan view illustrating the upper surface of the frame.
Figure 9:
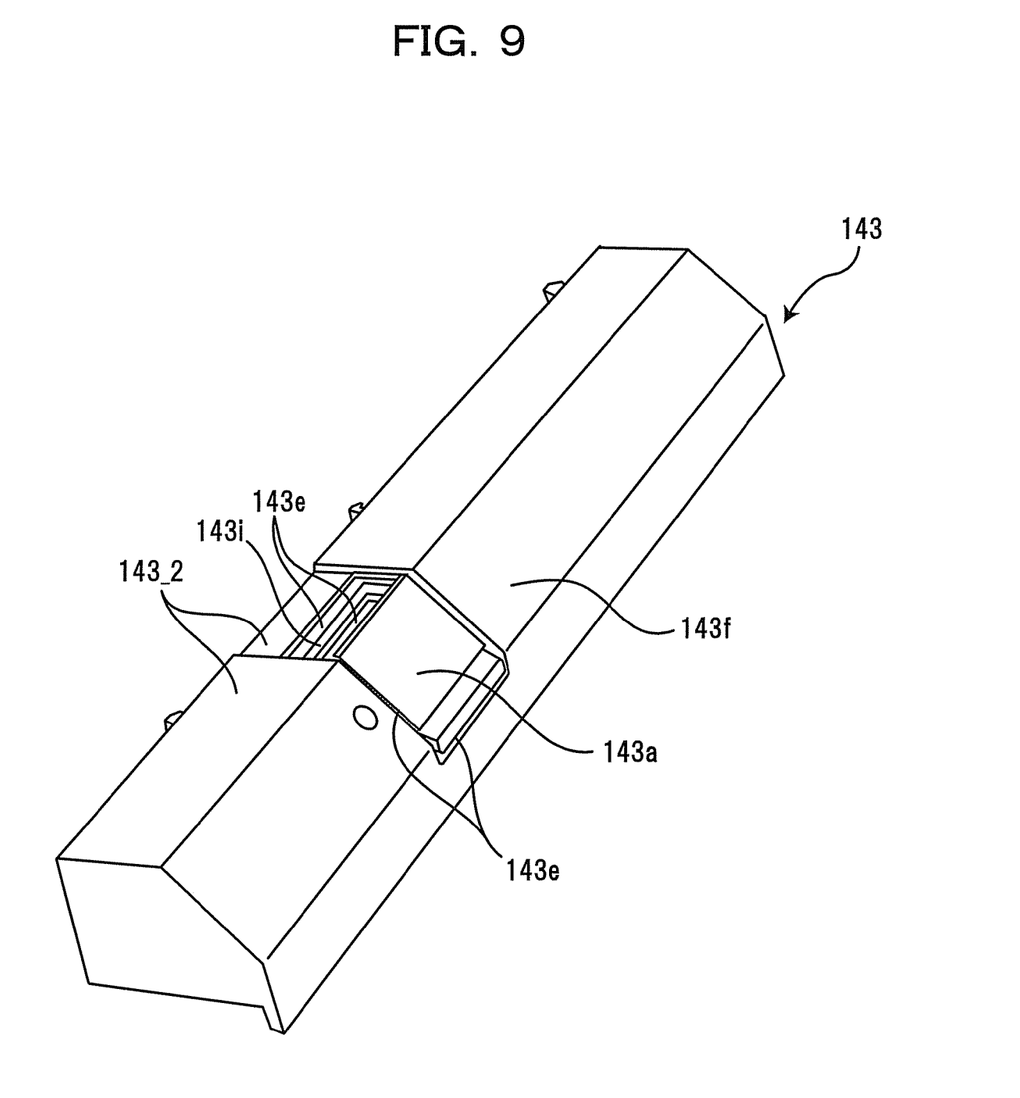
FIG. 9 is a perspective view of the frame illustrated from a direction in which the lower surface and outer surface thereof are viewed.
Figure 10:
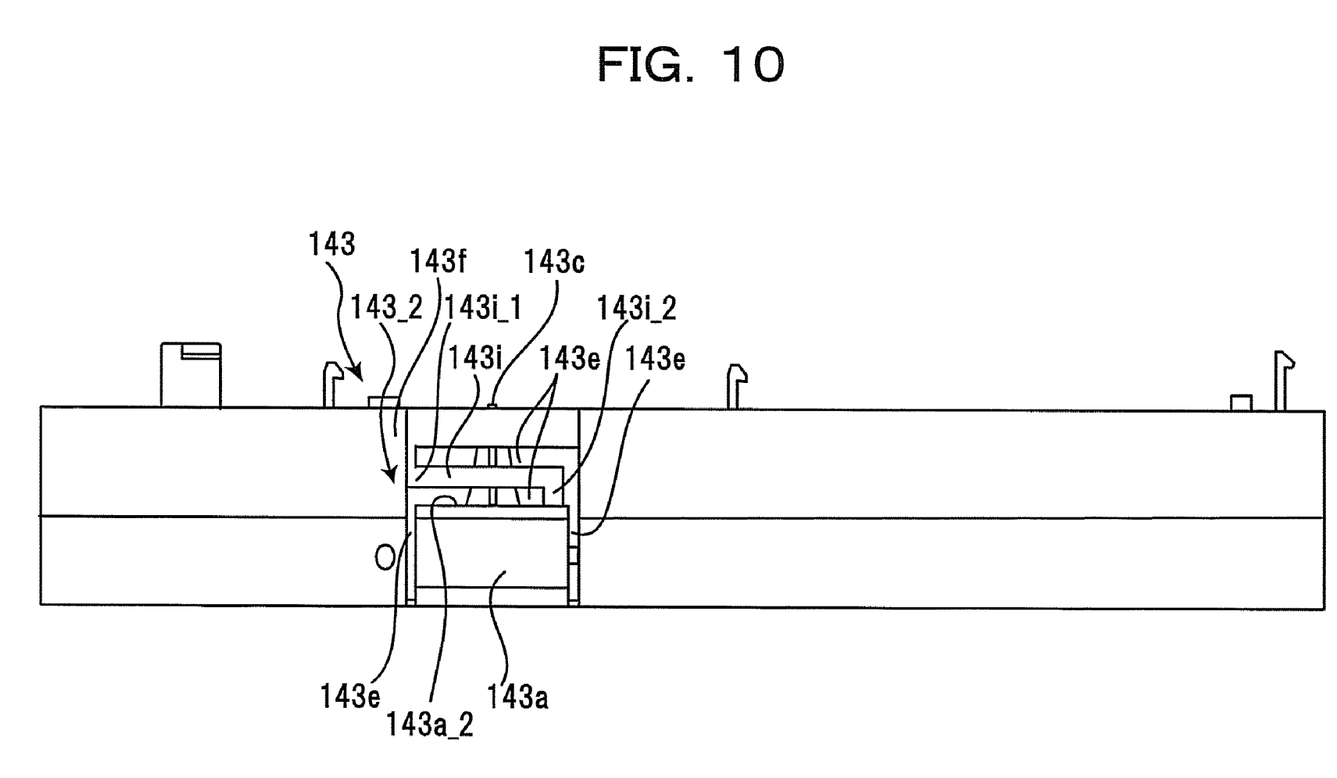
FIG. 10 is a plan view illustrating the lower surface of the frame.

FIG. 8 is a plan view illustrating the upper surface of the frame. Also, FIG. 9 is a perspective view of the frame illustrated from a direction in which the lower surface and outer surface thereof are viewed. Furthermore, FIG. 10 is a plan view illustrating the lower surface of the frame.

As illustrated in FIGS. 7 and 8, the opening 143e surrounding the operating section 143a expands as far as an upper surface 143_1 of the frame 143, and the elastic support piece 143h is provided on the upper surface 143_1. In the embodiment, two elastic support pieces are provided, and the elastic support piece 143h expressed in FIGS. 7 and 8 is one of the two elastic support pieces.

The elastic support piece 143h extends through the opening 143e along an edge 143a_1 of the operating section 143a adjacent to the opening 143e. One end of the elastic support piece 143h is connected to the frame main body 143f, and the other end to the operating section 143a.

Herein, the elastic support piece 143h extends from the one end 143h_1 connected to the frame main body 143f toward the other end 143h_2 connected to the operating section 143a, in FIG. 8, from the left toward the right. A continuation of the description of this point will be given hereafter.

Also, as illustrated in FIGS. 9 and 10, the opening 143e surrounding the operating section 143a extends to a lower surface 143_2 of the frame 143 too, and the other elastic support piece 143i is provided in the lower surface 143_2. In the same way as the elastic support piece 143h provided in the upper surface 143_1 (refer to FIGS. 7 and 8), the elastic support piece 143i also extends through the opening 143e along an edge 143a_2 of the operating section 143a adjacent to the opening 143e, and one end of the elastic support piece 143i is connected to the frame main body 143f, while the other end is connected to the operating section 143a.

Herein, the elastic support piece 143*i* extends from the one end 143*i*_1 connected to the frame main body 143*f* toward the other end 143*i*_2 connected to the operating section 143*a*, in FIG. 10, from the left toward the right. In the drawings, a direction in which the elastic support piece 143*i* extends is the same as a direction in which the elastic support piece 143*h* provided on the upper surface 143_1 illustrated in FIG. 8 extends, but in the actual frame 143, the extension directions of these two elastic support pieces 143*h* and 143*i* are opposite from each other. That is, the other ends 143*h*_2 and 143*i*_2 of the two respective elastic pieces 143*h* and 143*i*, which are connected to the operating section 143*a*, are in positions rotationally symmetric around the operation section 143*a*. Because of this, the operating section 143*a* is supported in a balanced manner by the two elastic support pieces 143*h* and 143*i*.

Also, the opening 143*e* around the operating section 143*a* circles the operating section 143*a*, except for two portions connected by the two elastic support pieces 143*h* and 143*i* disposed on the upper surface 143_1 and lower surface 143_2.

Herein, on the operating section 143*a* receiving a depression operation, the two elastic support pieces 143*h* and 143*i* bend elastically, biasing the operating section 143*a* toward the main body 141 (refer to FIG. 4) side. By so doing, the leading end of the projection 143*c* (refer to FIG. 6) provided on the rear surface of the operating section 143*a* pushes the button 141*a* (refer to FIG. 5) provided on the front end face of the main body 141, and the main body 141 slides out from the housing body 142. When a finger is taken off the operating section 143*a*, the elastic support pieces 143*h* and 143*i* return to their original shape, and the operating section 143*a* returns to the original position in which it is flush with the outer surface of the frame main body 143*f*.

In the embodiment, as the operating section 143*a* is surrounded by the opening 143*e*, and connected to the frame main body 143*f* via the two elastic support pieces 143*h* and 143*i*, as heretofore described, it being possible to bias the operating section 143*a* with a sufficient operational stroke when the operating section 143*a* receives a depression operation, it is possible to reliably push the button 141*a* (refer to FIG. 5) on the front end face of the main body 141.

Next, a description will be given of various kinds of modifications of a structure of the frame around the operating section.

Figure 11:
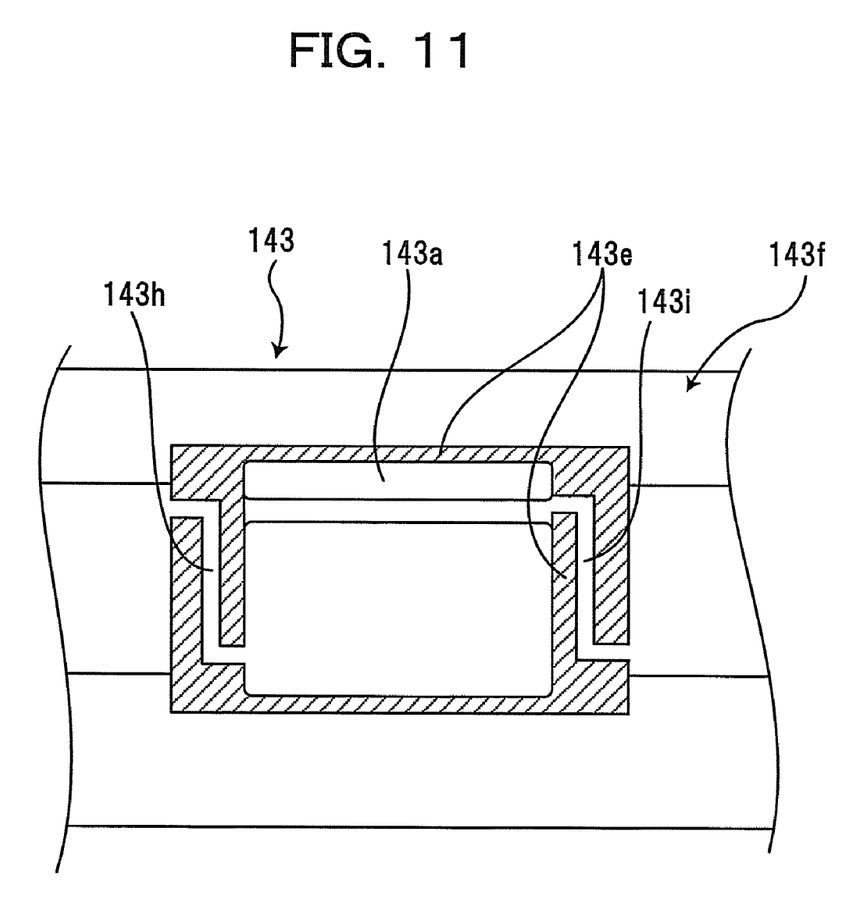
FIG. 11 is a diagram illustrating a first modification example.

FIG. 11 is a diagram illustrating a first modification example. The shaded area in FIG. 11 indicates an opening passing through the front and rear of the frame. The same applies to the drawings to be described hereafter. In FIG. 11 and each subsequent drawing, for the sake of understandability, identical numerals and characters are given to components corresponding to the components in the previously described embodiment, even in the event that they have differences in shape or disposition position, or the like.

In the previously described embodiment, the two elastic support pieces 143*h* and 143*i* are provided respectively on the upper surface 143_1 and lower surface 143_2 of the frame 143. That is, the two elastic support pieces 143*h* and 143*i* are disposed above and below, respectively, sandwiching the operating section 143*a* therebetween.

As opposed to this, in the modification example illustrated in FIG. 11, the two elastic support pieces 143*h* and 143*i* are disposed at the left and right, respectively, sandwiching the operating section 143*a* therebetween. In this way, it is also acceptable that the two elastic support pieces 143*h* and 143*i* are disposed at the left and right of the operating section 143*a*.

Figure 12:
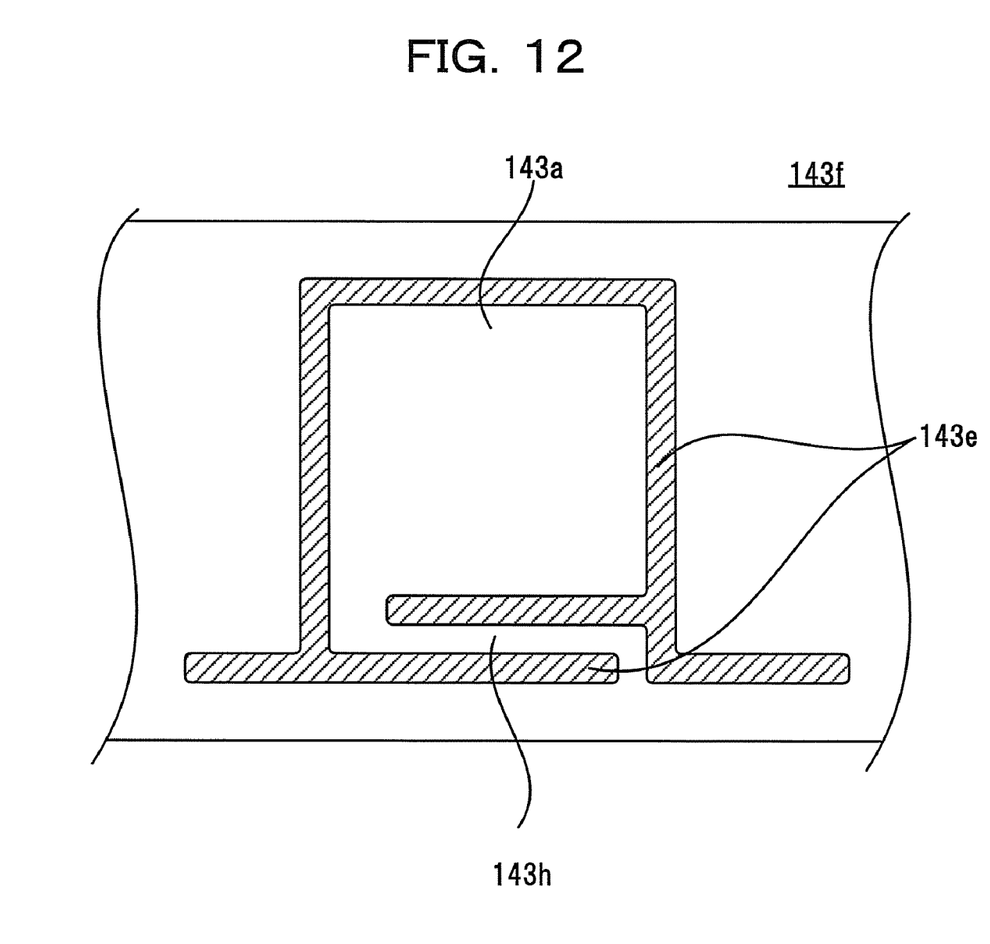
FIG. 12 is a diagram illustrating a second modification example.

FIG. 12 is a diagram illustrating a second modification example. In the modification example illustrated in FIG. 12, the operating section 143*a* is connected to the frame main body 143*f* by one elastic support piece 143*h*. In this way, it is also acceptable to provide only one elastic support piece, without necessarily proving a plurality of elastic support pieces.

Figure 13:
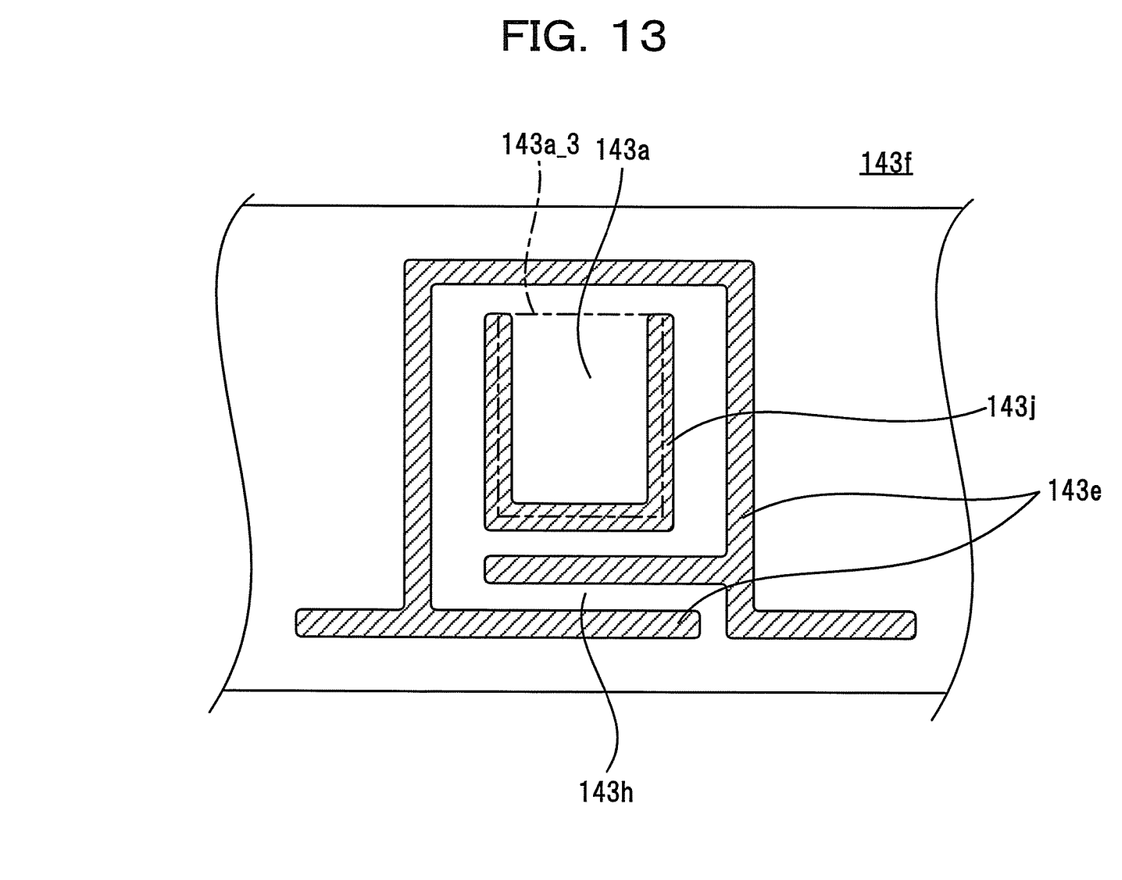
FIG. 13 is a diagram illustrating a third modification example.

FIG. 13 is a diagram illustrating a third modification example. In the third modification example illustrated in FIG. 13, one more opening, 143*j*, is formed than in the second modification example illustrated in FIG. 12. When supposing that a rectangle indicated by the dashed-dotted line in FIG. 13 is formed in the operating section 143*a*, the opening 143*j*, being an opening passing through the front and rear of the frame, extends along three sides of the rectangle, excepting only one side 143*a*_3 distant from the elastic support piece 143*h*.

In the case of the second modification example illustrated in FIG. 12, the operating section 143*a* is supported in a cantilever manner by the one elastic support piece 143*h*. For this reason, on the operating section 143*a* receiving a depression operation, a bias of the operating section 143*a* on a side distant from the elastic support piece 143*h* is likely to increase, and there is a fear of the operating section 143*a* being biased in such a way as to be tilted.

As opposed to this, in the case of the third modification example illustrated in FIG. 13, in addition to a cantilever shaped support by one elastic support piece 143*h* the same as that of FIG. 12, a portion inside the rectangle indicated by the dashed-dotted line is formed in a cantilever manner in an opposite direction. For this reason, when the operating section 143*a* is operated by depressing, even in the event that a portion of the operating section 143*a* outside the rectangle indicated by the dashed-dotted line is tilted in a cantilever manner, the central portion of the operating section 143*a* tends to be tilted in an opposite direction.

For this reason, when the operating section 143*a* is operated by depressing, the projection 143*c* provided in the leading end portion of the rear surface of the operating section 143*a* is biased in a straight line without being tilted.

The various embodiments include the heretofore described various modification examples. Although a description has herein been given of the notebook PC mounted with the CD/DVD drive unit, the medium drive unit of the invention, not being limited to the CD/DVD drive unit, is applicable to a general drive unit into which a storage medium is loaded, and which drives the loaded storage medium, such as, for example, a drive unit into which a blu-ray disc is loaded, and which drives the loaded blu-ray disc. Also, the electronic equipment of the invention, not being limited to the notebook PC, is applicable to general electronic equipment into which is loaded the medium drive unit of the invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A medium drive unit, comprising:
   a main body into which a storage medium is removably loaded, and which drives the loaded storage medium;
   a housing body that slidably houses the main body; and
   a frame that covers a front end face of the main body on a side toward which the main body slides out from the housing body, wherein
   the main body has a button that is provided on the front end face of the main body and is configured to be depressed in order to slide the main body out from the housing body, and
   the frame includes:
   an operating section including a projection disposed on a rear surface thereof facing the front end face of the main body, the projection projecting toward the button and being configured, upon receiving a depression operation from an outer surface side of the operating section, to be biased toward the front end face of the main body and to push the button with a leading end of the projection;
   a frame main body that surrounds the operating section so as to be separated from the operating section by an opening that surrounds the operating section and passes through a front surface and a rear surface of the frame; and
   an elastic support piece that extends through the opening along an edge of the operating section adjacent to the opening, the elastic support piece including one end that is connected to the frame main body and another end that is connected to the operating section and being configured to bend elastically and bias the operating section toward the front end face of the main body when the operating section receives the depression operation, wherein
   the whole of the frame, including the frame main body, the operating section, and the elastic support piece, is integrally formed.

2. The medium drive unit according to claim 1, wherein two elastic support pieces are formed sandwiching the operating section therebetween.

3. The medium drive unit according to claim 2, wherein the two elastic support pieces extend through the opening, in directions opposite to each other, from the one end connected to the frame main body toward the other end connected to the operating section.

4. An electronic apparatus including the medium drive unit according to claim 1.

5. The electronic apparatus according to claim 4, wherein the frame forms one portion of a surface of the electronic apparatus.

6. The electronic apparatus according to claim 5, further comprising:
   a computation unit including an embedded computation circuit carrying out a computation process, an upper surface of the computation unit being provided with a keyboard with which to input an instruction in accordance with an operation, wherein
   the frame of the medium drive unit forms one portion of one side surface of the computation unit.

* * * * *